United States Patent
Alrashid

(10) Patent No.: US 9,595,192 B1
(45) Date of Patent: Mar. 14, 2017

(54) TRAFFIC VIOLATION DETECTION SYSTEM

(71) Applicant: Ahmad Abdulaziz Alrashid, Safat (KW)

(72) Inventor: Ahmad Abdulaziz Alrashid, Safat (KW)

(*) Notice: Subject to any disclaimer, the term of this patent is extended or adjusted under 35 U.S.C. 154(b) by 0 days.

(21) Appl. No.: 15/099,513

(22) Filed: Apr. 14, 2016

(51) Int. Cl.
| G08G 1/017 | (2006.01) |
| G08G 1/052 | (2006.01) |
| G08G 1/01 | (2006.01) |
| G08G 1/054 | (2006.01) |
| G08G 1/02 | (2006.01) |
| H04N 5/77 | (2006.01) |
| H04N 7/18 | (2006.01) |

(52) U.S. Cl.
CPC ............ *G08G 1/0175* (2013.01); *G08G 1/01* (2013.01); *G08G 1/0116* (2013.01); *G08G 1/02* (2013.01); *G08G 1/052* (2013.01); *G08G 1/054* (2013.01); *H04N 5/772* (2013.01); *H04N 7/181* (2013.01)

(58) Field of Classification Search
CPC .......... G08G 1/0175; G08G 1/02; G08G 1/01; G08G 1/052; G08G 1/0116; G08G 1/054; H04N 5/772; H04N 7/181
See application file for complete search history.

(56) References Cited

U.S. PATENT DOCUMENTS

| 5,041,828 A | 8/1991 | Loeven |
| 5,839,816 A * | 11/1998 | Varga ..................... E01F 9/559 |
| | | 362/153.1 |
| 6,417,785 B1 | 7/2002 | Tyburski |
| 6,614,469 B1 | 9/2003 | Kato et al. |
| 6,914,541 B1 * | 7/2005 | Zierden .................. G08G 1/052 |
| | | 340/933 |
| 7,140,803 B2 | 11/2006 | Cummings et al. |
| 7,986,248 B2 * | 7/2011 | Lock .................... G08G 1/0175 |
| | | 340/916 |
| 8,639,435 B2 * | 1/2014 | Fliegen .................... G08G 1/04 |
| | | 340/905 |
| 2002/0060640 A1 * | 5/2002 | Davis .................... G01S 13/583 |
| | | 342/104 |
| 2012/0194357 A1 | 8/2012 | Ciolli |

FOREIGN PATENT DOCUMENTS

| CA | 2747769 A1 * | 1/2013 | ............. H04N 5/772 |
| KR | 10-1354057 | 1/2014 | |

* cited by examiner

*Primary Examiner* — Behrooz Senfi
*Assistant Examiner* — Maria Vazquez Colon
(74) *Attorney, Agent, or Firm* — Richard C. Litman

(57) ABSTRACT

The traffic violation detection system includes a series of smart road studs embedded in the roadway acting as sensors for vehicles moving in the prohibited manner. The road studs have a refraction surface on their upper surfaces for reflecting light to a solar panel, or may have the solar panel without the refraction surface. When the road studs initially sense a violating moving vehicle, an alert is sounded to warn the driver. If the vehicle continues to move in violation, a camera system is activated. The camera system includes solar panels, a camera lens, a light emitting flash mechanism, a distance IR sensor, and controls, all positioned on top of a vertically movable, hydraulic cylinder. The camera assembly is normally hidden underground but will rise to record images when activated by the road stud system. The images are sent to a central monitoring unit in a traffic monitoring building.

7 Claims, 3 Drawing Sheets

TRAFFIC VIOLATION DETECTION SYSTEM

BACKGROUND OF THE INVENTION

1. Field of the Invention

The present invention relates generally to traffic violation detection, and particularly to a traffic violation detection system for recording traffic violations of vehicles breaking the law by changing lanes in a prohibited manner.

2. Description of the Related Art

Devices for automatic photographic monitoring of road intersections controlled by traffic light are known. However devices for automatic photographic monitoring of illegal lane changes performed by vehicles in the road are not generally known.

Thus, a traffic violation detection system solving the aforementioned problems is desired.

SUMMARY OF THE INVENTION

The traffic violation detection system includes a series of smart road studs embedded in the roadway acting as sensors for vehicles moving in the prohibited manner. a refractive material is disposed on an upper surface of each road stud. The refractive material directs light to a solar panel disposed on the upper surface in the form of a laminate below the refractive material. Alternatively, the solar panel may be disposed on the upper surface without a refraction layer. When the road studs initially sense a violating moving vehicle, an alert is sounded to warn the driver. If the vehicle continues to move in violation, a camera system is activated. The camera system includes solar panels, a camera lens, a light emitting flash mechanism, a distance IR sensor, and controls, all positioned on top of a vertically movable, hydraulic cylinder. The camera assembly is normally hidden underground but will rise to record images when the hydraulic cylinder is activated by the road stud system. The images are sent to a central monitoring unit in a traffic monitoring building.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 2:
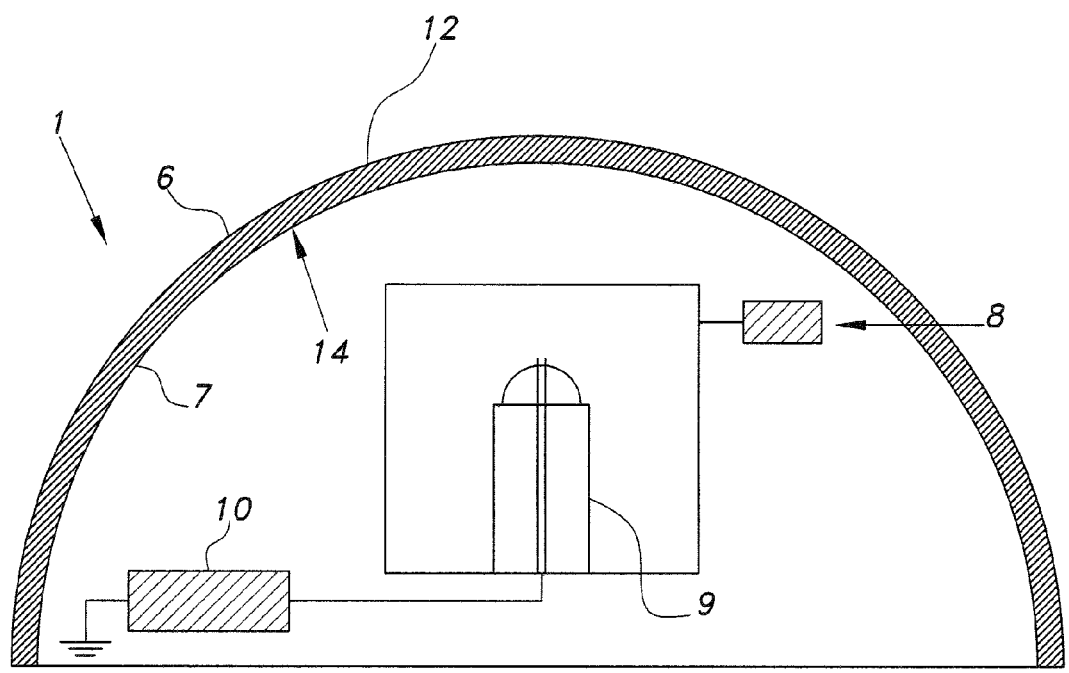
FIG. 2 is a pictorial diagram of the smart road stud according to the present invention.
Figure 3:
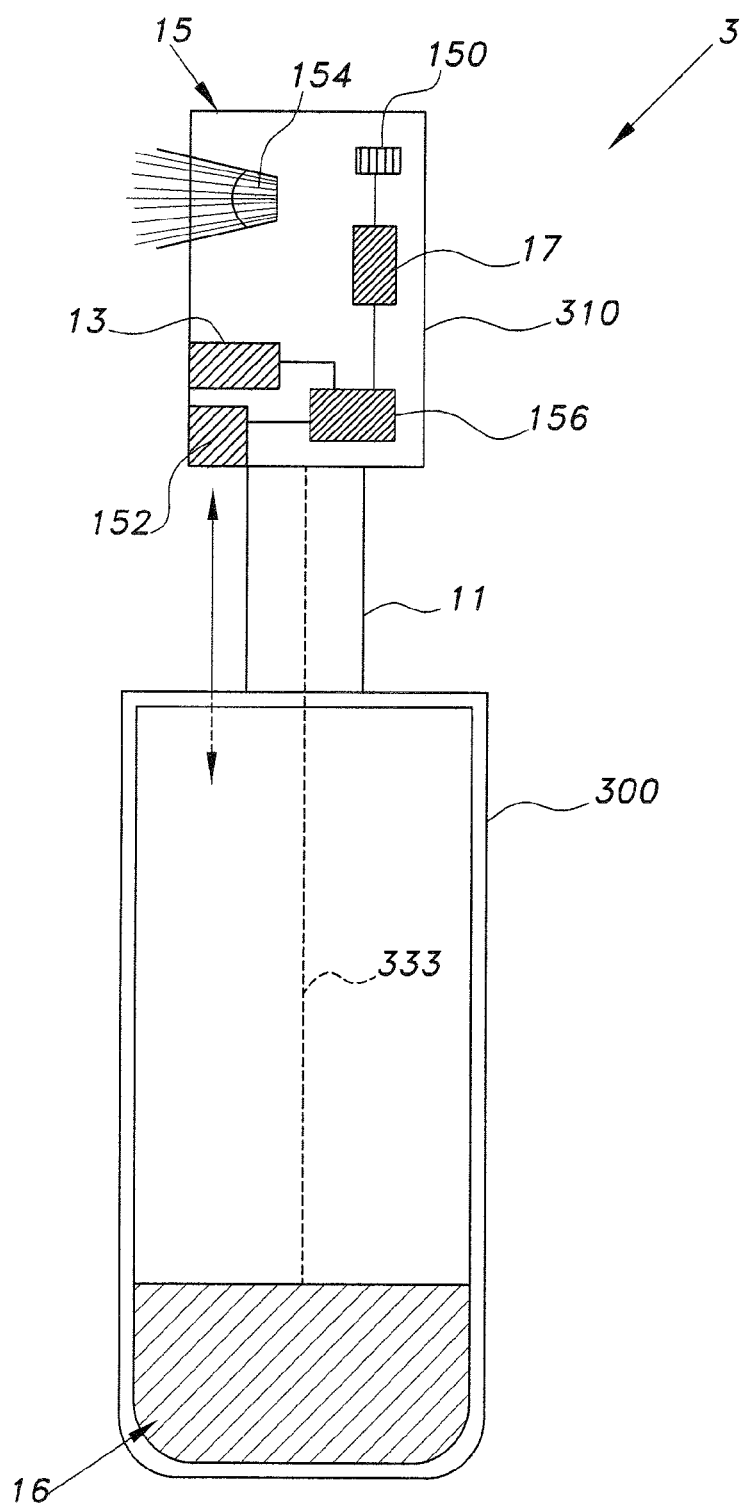
FIG. 3 is a plan view of the pop-up hidden camera according to the present invention.

The traffic violation detection system 20 includes a series of smart road studs 1 capable of being embedded in the roadway between a first lane 5, which is this case is a left lane 5, and a second lane 2, which in this case is a right lane 2. The smart road studs 1 act as sensors for detecting vehicles, such as vehicle V for example, when the driver of the vehicle V make a prohibited lane change between the right lane 2 and left lane 5. As illustrated in FIG. 2, the road studs 1 have a refractive layer 6 disposed on a generally dome-like upper surface 12 for refracting light to a solar panel 7 disposed on a layer 14 of the dome-like surface 12 beneath the refractive layer 6. Alternatively, the solar panel 7 may be disposed on a layer of the dome-like surface 12 without the refraction layer 6. When the road studs 1 initially sense a moving vehicle V in violation of the lane changing traffic laws, an alert is sounded to warn the driver of the violation. If the vehicle continues to move in violation, a camera system 3 is activated to visually record the violation. As shown in FIG. 3, the camera system 3 generally includes one or more solar panels 15, a camera lens 154, a light emitting flash mechanism 13, and controls, all positioned on top of a vertically movable, hydraulic cylinder 11. The camera system 3 is normally hidden underground and configured to rise above ground to record images when the hydraulic cylinder 11 is activated by the road stud system 1. The images are transmitted to a central monitoring unit in a traffic monitoring building (not shown).

Figure 1:
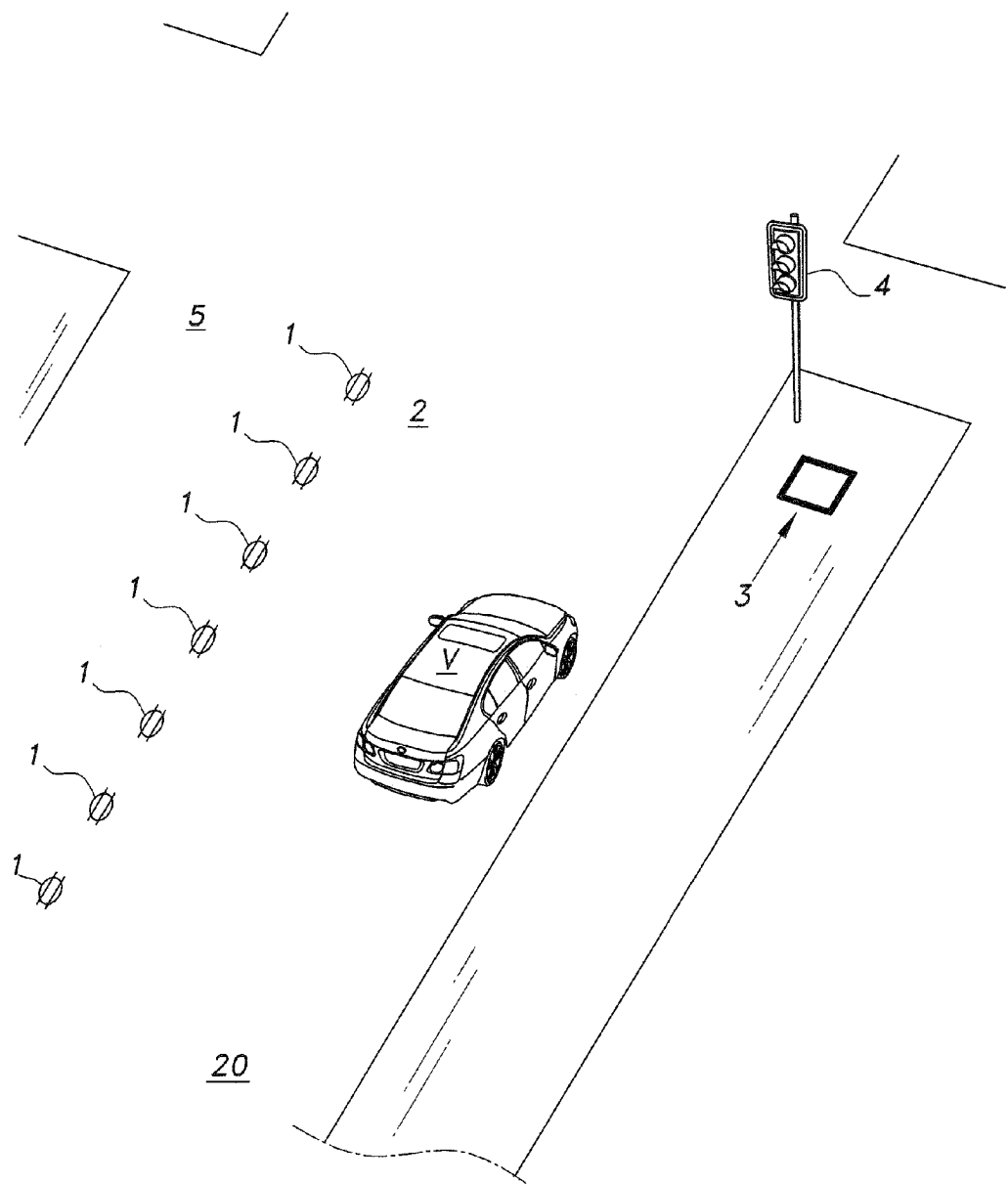
FIG. 1 is an environmental view of the traffic violation detection system according to the present invention.

As illustrated in FIG. 1, the vehicle V is in the right lane 2 near the traffic light 4 waiting for the traffic light 4 to change. If the driver were to begin to drive into the lane 5 before the traffic light 4 changes the smart road studs 1 will detect this illegal vehicle movement and initiate an alarm that is audible to the driver of vehicle V (and possibly visible). If the driver continues the illegal vehicle movement or turn, the smart road stud system 1 transmits an actuate signal to the hidden camera system 3, which then actuates a hydraulic cylinder 11 connected within the camera system 3 (as seen in FIG. 3). Upon activation, the stud system 1 actuate signal causes the hydraulic cylinder 11 to lift the camera system 3 above the ground to visually record or take a picture of the violation and/or violating vehicle. Once the camera system 3 is positioned above the ground, the camera system 3 is capable of capturing an image of the violating vehicle V.

As shown in FIG. 2, each smart road stud 1 may have an optional refractive layer 6 to refract the sunlight towards solar panels 7 disposed under the refractive layer 6 on the dome-like upper surface 12 of the smart road stud 1. Disposed inside the road stud 1 is a distance sensor 9, which may be an infra-red (IR) sensor, or a similar type of sensor, capable of detecting the distance of the vehicle V from the selected prohibited zone in the road, which has shown may be demarcated by the pattern of road studs 1. The distance sensor 9 may be preprogramed to trigger the camera system 3 when the vehicle V is at a pre-determined distance from the road stud 1. In this embodiment, it is contemplated that the distance sensor 9 may trigger the camera system 3 when the vehicle V is in the range of 10 to 20 cm from the road stud 1, however it is contemplated that other distances may be used to trigger the camera system 3. When the road stud 1 is triggered, it sends a signal to the camera system 3 via a transmitter 8 which is housed in the smart road stud 1. A rechargeable battery 10, or energy source, powers the electronics of smart road stud 1. The distance sensor 9 detects the distance from one side only (side of violation only in FIG. 1, right side of the smart road studs 1).

As illustrated in FIG. 3, the hidden camera system 3 may include a hydraulic cylinder 11 which moves vertically to adjust the camera system 3 between an extended position up and away from the hydraulic cylinder housing 300, and into a retracted position down and into the hydraulic cylinder housing 300. A camera assembly housing 310 is disposed on top of the hydraulic cylinder 11 and houses the camera system 3 or assembly electronics discussed infra. A transmit/receive (TX/RX) unit 152 is configured for receiving a signal from the smart road stud system 1. The unit 152 is configured to operate a loudspeaker disposed in processor 156, which is capable of alerting the driver of vehicle V by sending an alarm sound. The system 1 and unit 152 is capable of announcing the vehicle plate number while at the same time capturing an image of the license plate using the camera lens 154. The camera lens 154 with assistance of camera flash 13, is in operable communication with charge coupled device (CCD) 150. If the driver doesn't respond to the alarm and continues to pass over the boundary delineated by the road studs 1 am image with the plate number is recorded and stored in the internal memory 17 via CCD 150 connection to the internal memory 17. The camera may use the transmit portion of TX/RX unit 152 to communicate with a central monitoring unit in a traffic control building.

The camera's internal processor 156 provides the means for controlling the operation of the system. The solar panel 15 is disposed on an upper portion of the camera system 3 and recharges the battery 16 to provide power to the system. Battery 16 is connected to the electronics of camera system 3 via flexible conductor 333.

It is to be understood that the present invention is not limited to the embodiments described above, but encompasses any and all embodiments within the scope of the following claims.

I claim:

1. A traffic violation detection system for monitoring and recording traffic violations of vehicles, the system comprising:
   a plurality of structures disposed in a road to delineate a boundary in the road;
   a transmitter housed inside each one of the plurality of structures: a distance sensor housed inside each one of the plurality of structures, each distance sensor being in operable communication with the transmitter in the respective structure;
   a rechargeable battery housed inside each one of the plurality of structures for supplying power to the respective transmitter and the respective distance sensor;
   wherein the distance sensor generates a triggering signal to the transmitter when a vehicle is within a pre-selected distance from the at least one structure;
   wherein the transmitter transmits a proximity signal indicating that the vehicle is within the pre-selected distance from the each one of the plurality of structures;
   a hydraulic cylinder housing;
   a hydraulic cylinder extendably and retractably disposed inside the hydraulic cylinder housing;
   a camera assembly housing disposed on top of the hydraulic cylinder;
   a transmit/receive (TX/RX) unit disposed in the camera assembly housing;
   a camera lens disposed in the camera assembly housing;
   a charge coupled device (CCD) disposed in the camera assembly housing and being in operable communication with the camera lens;
   a processor disposed in the camera assembly housing;
   a memory storage unit disposed in the camera assembly housing and connected to the CCD;
   a camera flash unit disposed in the camera assembly housing; a processor disposed in the camera assembly housing, the processor being connected to the camera flash unit, TX/RX unit, and memory storage unit;
   a rechargeable battery disposed in the bottom of the hydraulic cylinder housing;
   a flexible conductor connected to the rechargeable battery and connected to the camera assembly housing to power the camera flash unit TX/RX unit, memory storage unit, CCD, and processor.

2. The traffic violation detection system according to claim 1, further comprising a solar panel disposed on top of the camera assembly housing, the solar panel being in operable communication with the rechargeable battery disposed in the bottom of the hydraulic cylinder housing to recharge the rechargeable battery.

3. The traffic violation detection system according to claim 2, further comprising a loudspeaker disposed in the camera assembly housing and connected to the processor.

4. The traffic violation detection system according to claim 3, further comprising:
   means for receiving the proximity signal;
   means for extending the hydraulic cylinder out of the hydraulic cylinder housing when the vehicle has triggered the proximity signal;
   means for operating the loudspeaker to alert a driver of the vehicle that has triggered the proximity signal; and
   means for recording an image of the vehicle that has triggered the proximity signal and continues to trigger the proximity signal subsequent to the driver alert operation from the loudspeaker.

5. The traffic violation detection system according to claim 4, wherein the driver alert includes an announcement of the vehicle plate number.

6. The traffic violation detection system according to claim 5, wherein the image of the vehicle includes an image of the vehicle plate number.

7. The traffic violation detection system according to claim 6, further comprising means for communicating the vehicle image to a central monitoring unit in a traffic control building.

* * * * *